(12) United States Patent
Trott

(10) Patent No.: US 9,090,002 B2
(45) Date of Patent: Jul. 28, 2015

(54) SEALING DEVICE IN A POLYMER FILTRATION DEVICE

(75) Inventor: Delano B. Trott, Danvers, MA (US)

(73) Assignee: Kolcor Technologies LLC, Agawam, MA (US)

( * ) Notice: Subject to any disclaimer, the term of this patent is extended or adjusted under 35 U.S.C. 154(b) by 548 days.

(21) Appl. No.: 13/267,294

(22) Filed: Oct. 6, 2011

(65) Prior Publication Data

US 2013/0087975 A1 Apr. 11, 2013

(51) Int. Cl.
*F16J 15/40* (2006.01)
*F16J 15/16* (2006.01)
*B29C 47/00* (2006.01)

(52) U.S. Cl.
CPC .......... *B29C 47/0026* (2013.01); *F16J 15/164* (2013.01); *B01D 2201/342* (2013.01); *B01D 2201/347* (2013.01)

(58) Field of Classification Search
None
See application file for complete search history.

(56) References Cited

U.S. PATENT DOCUMENTS

| | | | |
|---|---|---|---|
| 2,640,033 A | 5/1953 | Marshall | |
| 3,455,357 A * | 7/1969 | Zink | 425/153 |
| 3,675,934 A * | 7/1972 | Heston | 210/447 |
| 3,684,419 A | 8/1972 | Voight | |
| 3,743,101 A * | 7/1973 | Schmidt | 210/447 |
| 3,797,665 A * | 3/1974 | Paquette | 210/236 |
| 3,804,758 A * | 4/1974 | Cooper et al. | 210/741 |
| 3,856,680 A * | 12/1974 | Elmore | 210/184 |
| 3,876,545 A | 4/1975 | Norwood | |
| 3,947,202 A | 3/1976 | Göller et al. | |
| 3,962,092 A | 6/1976 | Newman, Jr. | |
| 3,971,721 A * | 7/1976 | Fogarty, Jr. | 210/401 |
| 3,983,038 A * | 9/1976 | Heston | 210/447 |
| 4,025,434 A * | 5/1977 | Mladota | 210/236 |
| 4,059,925 A | 11/1977 | Eadow-Allen | |
| 4,159,953 A * | 7/1979 | Paquette | 210/396 |
| 4,167,384 A * | 9/1979 | Shirato et al. | 425/183 |
| 4,237,014 A | 12/1980 | Trott | |
| 4,268,391 A * | 5/1981 | Paquette | 210/236 |
| 4,359,387 A | 11/1982 | Trott | |
| 4,468,322 A * | 8/1984 | Fogarty et al. | 210/236 |
| 4,470,607 A | 9/1984 | Schier et al. | |
| 4,507,072 A | 3/1985 | Gaul, Jr. | 425/185 |
| 4,511,472 A * | 4/1985 | Trott | 210/340 |
| 4,814,186 A * | 3/1989 | Trott | 425/199 |
| 4,849,113 A | 7/1989 | Hills | |
| 5,116,066 A * | 5/1992 | Crawford | 277/384 |
| 5,417,866 A | 5/1995 | Trott | |
| 5,439,589 A | 8/1995 | Whitman | |
| 5,507,498 A | 4/1996 | Trott | |
| 5,578,206 A * | 11/1996 | Ogoshi et al. | 210/236 |
| 5,603,828 A * | 2/1997 | Ishida et al. | 210/239 |
| 5,672,269 A * | 9/1997 | White | 210/130 |
| 5,833,848 A * | 11/1998 | Tominari et al. | 210/232 |

(Continued)

*Primary Examiner* — Robert James Popovics
(74) *Attorney, Agent, or Firm* — Hamilton, Brook, Smith & Reynolds, P.C.

(57) ABSTRACT

A sealing device for sealing a slide plate in a polymer filtration apparatus where the slide plate is translatable across an extrusion bore extending through a housing of the polymer filtration apparatus. A spring device can be positioned around the outer periphery surfaces of the seal for axially biasing the sealing surface of the seal against the slide plate with a preload bias. Increasing pressure of polymer in the extrusion bore can enter a region in the seal cavity upstream of the thrust surface of the seal and can provide polymer pressure in the axial direction for exerting axial force against the thrust surface of the seal for causing the sealing surface to be further biased against the slide plate.

12 Claims, 6 Drawing Sheets

(56) References Cited

U.S. PATENT DOCUMENTS

| | | | |
|---|---|---|---|
| 5,840,197 A * | 11/1998 | Ishida et al. | 210/780 |
| 6,010,625 A | 1/2000 | Whitman | |
| 6,153,093 A | 11/2000 | Bentivoglio | |
| 6,168,411 B1 | 1/2001 | Wildman | |
| 6,216,880 B1 * | 4/2001 | Previero | 210/359 |
| 6,238,558 B1 | 5/2001 | Kelley | |
| 6,698,669 B2 * | 3/2004 | Rieben | 239/225.1 |
| 7,147,774 B2 | 12/2006 | Jones, III | |
| 7,661,941 B2 | 2/2010 | Ouriev | |
| 2003/0071141 A1 * | 4/2003 | Rieben | 239/225.1 |
| 2004/0200784 A1 * | 10/2004 | Jones, III | 210/767 |
| 2013/0087975 A1 * | 4/2013 | Trott | 277/308 |
| 2013/0126410 A1 * | 5/2013 | Arita et al. | 210/232 |
| 2014/0305853 A1 * | 10/2014 | Panebianco | 210/97 |
| 2014/0353261 A1 * | 12/2014 | Cavanagh et al. | 210/783 |
| 2015/0014257 A1 * | 1/2015 | Cavanagh et al. | 210/774 |

* cited by examiner

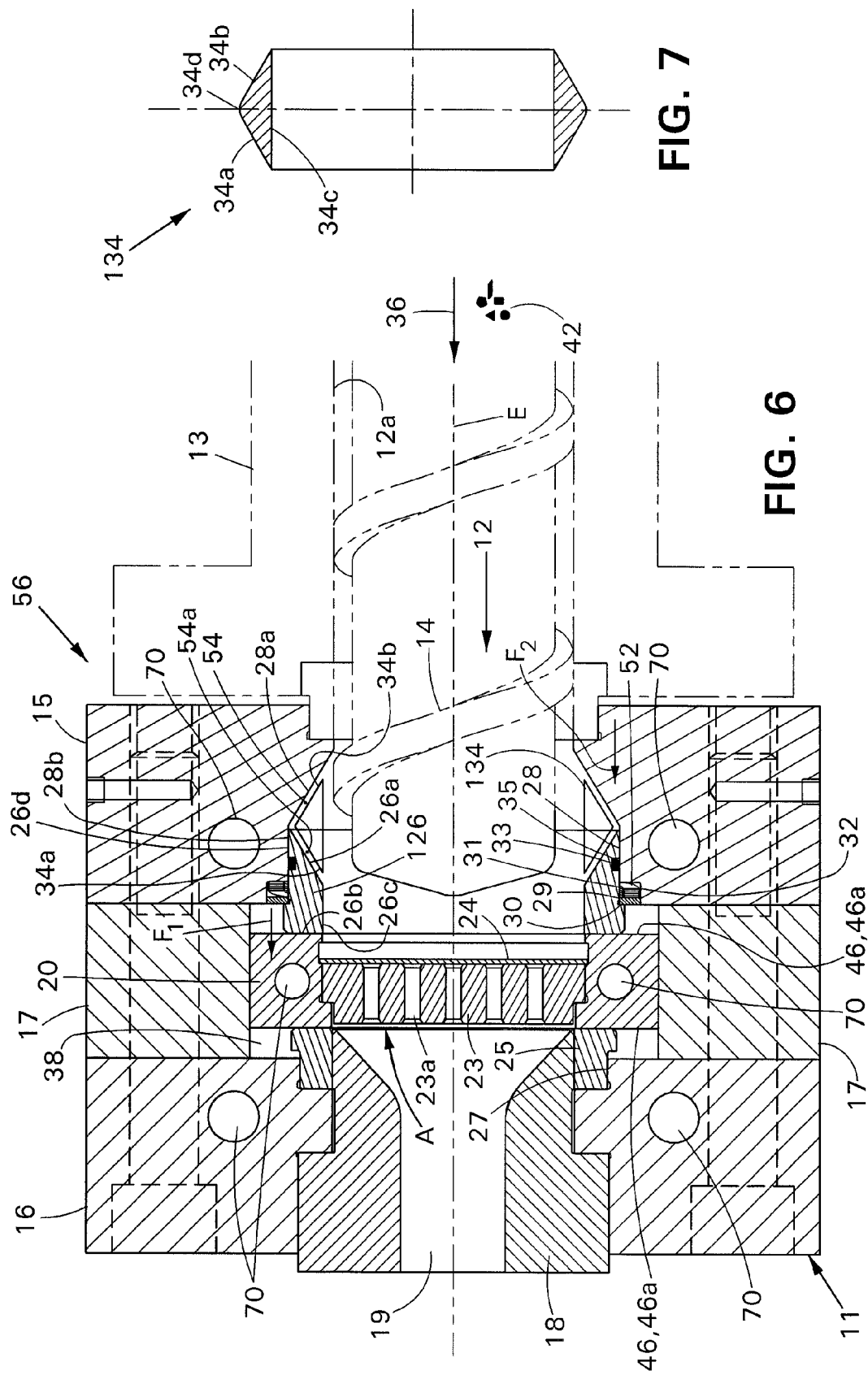

SEALING DEVICE IN A POLYMER FILTRATION DEVICE

BACKGROUND

Screen changers used in the extrusion of molten polymer often incorporate a slide plate located within a housing. The slide plate contains filtering elements for removing impurities from the polymer and is moveable across a bore within the housing. An extrusion apparatus forces polymer through the bore and the filter element which is aligned with it. When the filter becomes clogged with impurities and replacement is desired, the slide plate is translated to a position in which a second filter element is aligned with the bore, and the first filter element can be removed and replaced. Sealing members in the housing bear against the surfaces of the slide plate to prevent polymer leakage from the bore when a filter element is aligned with the bore. Due to high polymer pressure during extrusion, the seal must be capable of being biased against the slide plate with a substantial force to prevent leakage during operation.

SUMMARY

Some prior art screen changers have a spring with a large spring constant for producing such a substantial biasing sealing force to prevent leakage, which can cause excessive wear or damage to the seal and slide plate surfaces, and also requires a large amount of force to move the slide plate, even when at rest. In addition, some prior art screen changers have a seal design with regions or cavities that trap excessive quantities of polymer, which then overheats and degrades, forming undesirable contaminants within the polymer. The present invention can provide a screen changer which can bias a seal with a light preload bias against the slide plate, which does not cause excessive wear to the slide plate when the slide plate is shifted, and can also seal low pressure polymer during start up. During extrusion, the seal can be increasingly biased against the slide plate with increasing polymer pressure in the bore to provide sealing of high pressure polymer, and at the same time, has a seal design that does not allow excessive quantities of polymer from being trapped and heat or thermally degraded.

The present invention can provide a sealing device for sealing a slide plate in a polymer filtration apparatus where the slide plate is translatable across an extrusion bore extending through a housing of the polymer filtration apparatus. The sealing device can include a periphery seal having inner periphery surfaces, outer periphery surfaces, an axial periphery sealing surface at a downstream axial end for contacting and sealing against a slide plate, and a periphery thrust surface located at an upstream axial end of the seal. The seal can be seated in a seal cavity surrounding the extrusion bore. A spring device can be positioned around the outer periphery surfaces of the seal for axially biasing the sealing surface of the seal against the slide plate with a preload bias. Increasing pressure of polymer in the extrusion bore can enter a region in the seal cavity upstream of the thrust surface and can provide polymer pressure in the axial direction for exerting axial force against the thrust surface of the seal for causing the sealing surface to be further biased against the slide plate. A periphery axial gap regulating member can be positioned within the seal cavity between the thrust surface at the upstream axial end of the seal and an upstream axial end surface of the seal cavity. The axial gap regulating member can be sized to provide a periphery polymer pressure gap that is sized for permitting entry of a thin periphery film of polymer for exerting an axial periphery force against the thrust surface of the seal while at the same time minimizing an amount of polymer trapped and heat degraded in the polymer pressure gap. The axial gap regulating member can be formed of a material having a higher coefficient of expansion than the seal and the housing, for expanding and minimizing the size of the polymer pressure gap as heat increases.

In particular embodiments, the periphery seal can be an annular seal having inner diameter surfaces and outer diameter surfaces, an annular sealing surface and an annular thrust surface. The seal can be seated in the annular seal cavity surrounding the extrusion bore. A spring device can be positioned circumferentially around the outer diameter surfaces of the seal. The spring device can include at least one wave spring mounted concentrically around the seal and between the housing and a shoulder of the seal. The spring device can be positioned within an annular spring device cavity in the housing surrounding the seal. The spring device can further include an annular cover member positioned in the annular spring device cavity and covering the at least one wave spring for preventing entry of contaminants from the atmosphere into the annular spring device cavity. A circumferential seal can be positioned within the annular seal cavity between the outer diameter surfaces of the seal and mating sealing surfaces of the annular seal cavity upstream of the spring device. The axial gap regulating member can be formed of metal and can be annular in shape. The axial gap regulating member can be positioned within the annular seal cavity between the thrust surface at the upstream axial end of the seal and an upstream axial end surface of the annular seal cavity. The axial gap regulating member can be sized to provide an annular polymer pressure gap that is sized for permitting entry of a thin annular film of polymer for exerting an axial annular force against the thrust surface of the seal. The thrust surface of the seal can be angled inwardly starting from the outer diameter surfaces at the upstream axial end. The axial gap regulating member can have at least one tapered surface. One tapered surface can engage the thrust surface of the seal. The seal and the housing can be formed of steel and the axial gap regulating member can be formed of bronze. The axial gap regulating member can be solid with smooth inner and outer diameter surfaces. The polymer pressure gap can be about 0.005 to about 0.045 inches.

The present invention can also provide a polymer filtration apparatus including a housing having an extrusion bore extending therethrough. A slide plate having at least one filter can be translatable across the extrusion bore. A sealing device can be included and have an annular seal having inner diameter surfaces, outer diameter surfaces, an axial annular sealing surface at a downstream axial end for contacting and sealing against the slide plate, and an annular thrust surface located at an upstream axial end of the seal. The seal can be seated in an annular seal cavity in the housing surrounding the extrusion bore. At least one wave spring can be mounted concentrically around the seal and between the housing and a shoulder of the seal for axially biasing the sealing surface of the seal against the slide plate with a preload bias. Increasing pressure of polymer in the extrusion bore can enter a region in the annular seal cavity upstream of the thrust surface for providing polymer pressure in the axial direction for exerting axial force against the thrust surface of the seal for causing the sealing surface to be further biased against the slide plate. An annular metallic axial gap regulating member can be positioned within the annular seal cavity between the thrust surface at the upstream axial end of the seal and an upstream axial end surface of the annular seal cavity. The annular metallic axial gap regulating member can be sized to provide an annular polymer pressure gap that is sized for permitting entry of a thin annular film of polymer for exerting an axial annular force against the thrust surface of the seal while at the same time minimizing an amount of polymer trapped and heat degraded in the annular polymer pressure gap. The annular metallic axial gap regulating member can be formed of a metal having a higher coefficient of expansion than the seal and the housing, for expanding and minimizing the size of the annular polymer pressure gap as heat increases.

The present invention can also provide a method of sealing a slide plate with a sealing device in a polymer filtration apparatus where the slide plate is translatable across an extrusion bore extending through a housing of the polymer filtration apparatus. A periphery seal can be seated in a seal cavity in the housing surrounding the extrusion bore. The seal can have inner periphery surfaces, outer periphery surfaces, an axial periphery sealing surface at a downstream axial end for contacting and sealing against the slide plate, and a periphery thrust surface located at an upstream axial end of the seal. The sealing surface of the seal can be axially biased against the slide plate in a preload bias with a spring device positioned around the outer periphery surfaces of the seal. Increasing pressure of polymer in the extrusion bore can enter a region in the seal cavity upstream of the thrust surface and provide polymer pressure in the axial direction for exerting axial force against the thrust surface of the seal for causing the sealing surface to be further biased against the slide plate. A periphery axial gap regulating member can be positioned within the seal cavity between the thrust surface at the upstream axial end of the seal and an upstream axial end surface of the seal cavity. The axial gap regulating member can be sized to provide a periphery polymer pressure gap that is sized for permitting entry of a thin periphery film of polymer for exerting an axial periphery force against the thrust surface of the seal while at the same time minimizing an amount of polymer trapped and heat degraded in the polymer pressure gap. The axial gap regulating member can be formed of a material having a higher coefficient of expansion than the seal and the housing, for expanding and minimizing the size of the polymer pressure gap as heat increases.

In particular embodiments, the seal can be an annular seal that is seated in an annular seal cavity, and can have inner diameter surfaces, outer diameter surfaces, an annular sealing surface and an annular thrust surface. A spring device can be positioned circumferentially around the outer diameter surfaces of the seal. At least one wave spring can be mounted concentrically around the seal and between the housing and a shoulder of the seal. The spring device can be positioned within an annular spring device cavity in the housing surrounding the seal. An annular cover member can be positioned in the annular spring device cavity and cover the at least one wave spring for preventing entry of contaminants from the atmosphere into the annular spring device cavity. A circumferential seal can be positioned within the annular seal cavity between the outer diameter surfaces of the seal and mating sealing surfaces of the annular seal cavity upstream of the spring device. The axial gap regulating member can be formed from metal, can have an annular shape, and can be positioned within the annular seal cavity between the thrust surface at the upstream axial end of the seal and an upstream axial end surface of the annular seal cavity. The axial gap regulating member can be sized to provide an annular polymer pressure gap that is sized for permitting entry of a thin annular film of polymer for exerting an axial annular force against the thrust surface of the seal. The thrust surface of the seal can be provided with an inward angle starting from the outer diameter surfaces at the upstream axial end. The axial gap regulating member can be provided with at least one tapered surface. One tapered surface can engage the thrust surface of the seal. The seal and housing can be formed from steel and the axial gap regulating member can be formed from bronze. The axial gap regulating member can be solid with smooth and inner and outer diameter surfaces. The polymer pressure gap can be formed to be about 0.005 to about 0.045 inches.

The present invention can also provide a method of sealing a slide plate in a polymer filtration apparatus where the slide plate is translatable across an extrusion bore extending through a housing of the polymer filtration apparatus. An annular seal can be seated in an annular seal cavity in the housing surrounding the extrusion bore. The seal can have inner diameter surfaces, outer diameter surfaces, an axial annular sealing surface at a downstream axial end for contacting and sealing against the slide plate, and an annular thrust surface located at an upstream axial end of the seal. The sealing surface of the seal can be axially biased against the slide plate with a preload bias with at least one wave spring mounted concentrically around the seal and between the housing and a shoulder of the seal. Increasing pressure of polymer in the extrusion bore can enter a region in the annular seal cavity upstream of the thrust surface for providing polymer pressure in the axial direction for exerting axial force against the thrust surface of the seal causing the sealing surface to be further biased against the slide plate. An annular metallic axial gap regulating member can be positioned within the annular seal cavity between the thrust surface at the upstream axial end of the seal and an upstream axial end surface of the annular seal cavity. The annular metallic axial gap regulating member can be sized to provide an annular polymer pressure gap that is sized for permitting entry of a thin annular film of polymer for exerting an axial annular force against the thrust surface of the seal while at the same time minimizing an amount of polymer trapped and heat degraded in the annular polymer pressure gap. The annular metallic axial gap regulating member can be formed of a metal having a higher coefficient of expansion than the seal and the housing, for expanding and minimizing the size of the annular polymer pressure gap as heat increases.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is a sectional view showing another embodiment of a sealing device.

FIG. 7 is a sectional view of the axial gap regulating member in FIG. 6.

DETAILED DESCRIPTION

Figure 1:
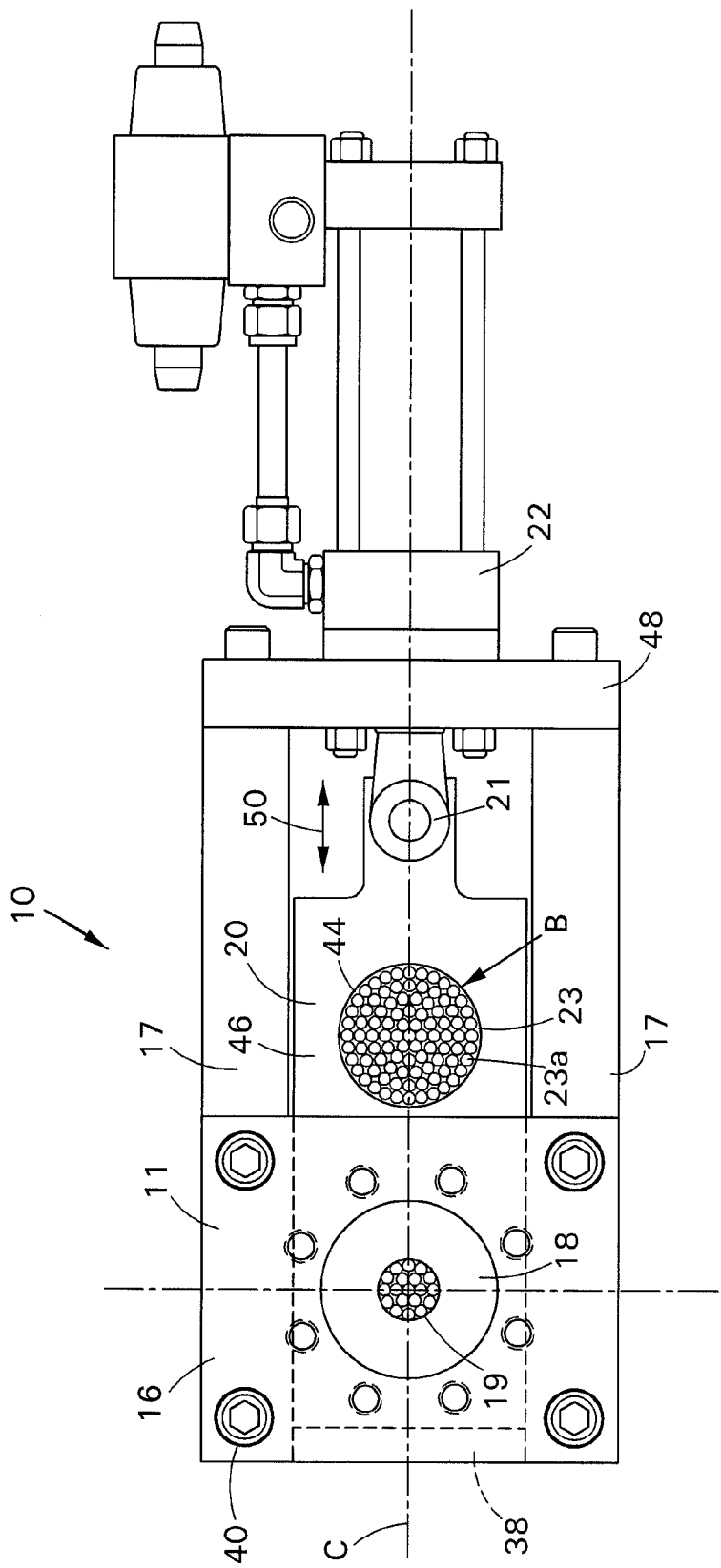
FIG. 1 is a front view of an embodiment of a screen changer or polymer filtration apparatus mounted to an extrusion bore of an extrusion apparatus in the present invention.
Figure 2:
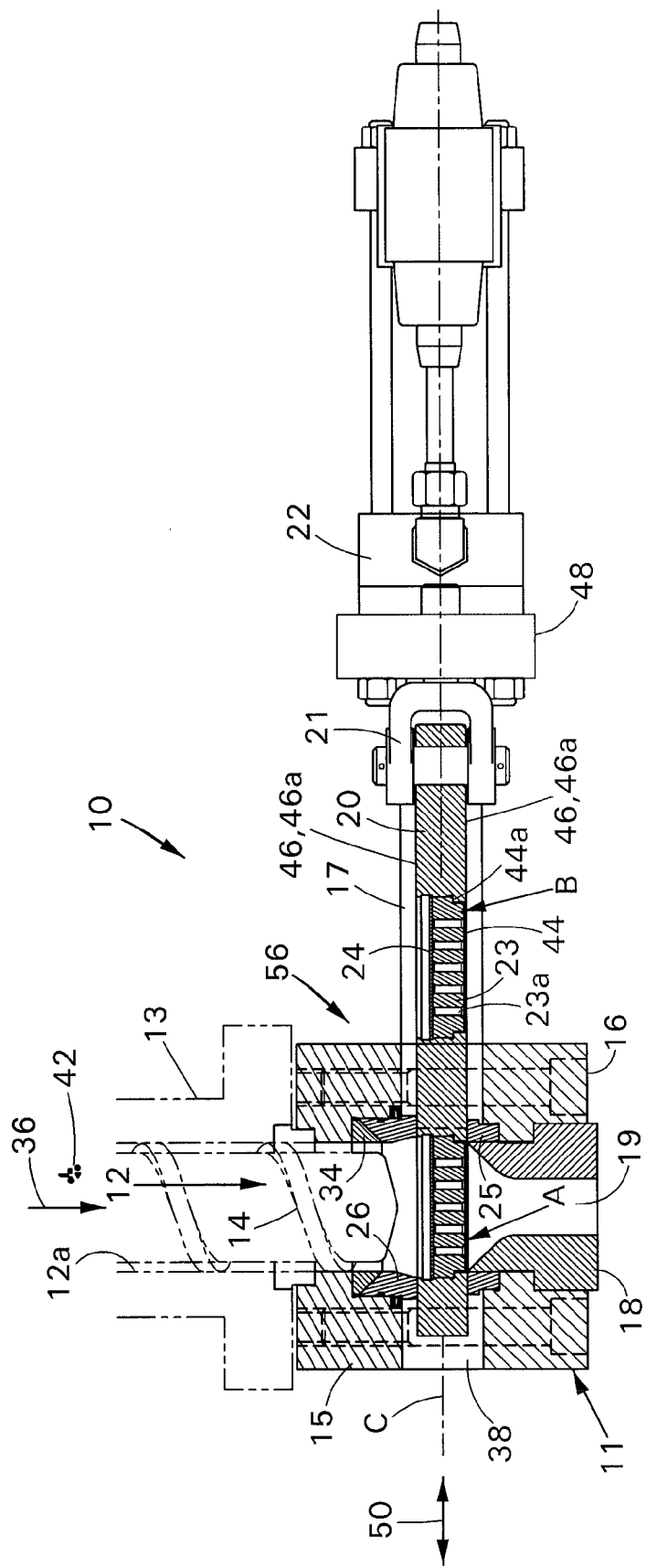
FIG. 2 is a top view of FIG. 1 with a portion of the slide plate and extrusion bore being in section, showing an embodiment of a sealing device in the present invention.

A description of example embodiments of the invention follows.

Referring to FIGS. 1-4, in one embodiment of the present invention, screen changer or polymer filtration apparatus 10 can be mounted to an extruder 13 on the downstream side. The extruder 13 can have an extrusion screw 14, that rotates within an extrusion bore 12a about an elongate or longitudinal extrusion axis E, for delivering molten polymer 36 to the screen changer 10.

The screen changer 10 can include a housing 11 having an extrusion bore 12 extending therethrough, that is in alignment with the extrusion bore 12a of extruder 13 along axis E. The housing 11 can include an upstream housing portion 15 and a downstream housing portion 16, which are spaced apart from each other, and secured to spaced upper and lower spacer bars or members 17, such as by fasteners 40, and forming a gap 38 therebetween. A bore adapter 18 can be positioned within the bore 12 in the downstream housing portion 16. The bore adapter 18 can have a tapered bore 19 forming a narrowing bore that provides a smooth transition between the diameter of bore 12 and the bore of equipment connected to the downstream side of the housing 11 of screen changer 10.

A slide plate 20 can be slidably mounted across extrusion bore 12 transverse or orthogonal to axis E, along a slide axis C within the gap 38 between the housing portions 15 and 16, and between the spacer bars 17. The slide plate 20 can have a generally rectangular shape as well as a rectangular cross section, and can house two side by side filter assemblies A and B for filtering contaminants, impurities or particles 42 from the molten polymer 36 exiting extruder 13 and flowing through extrusion bore 12. Each filter assembly A and B can included a breaker plate 23 with perforations, holes or openings 23a. Each breaker plate 23 can be positioned or rested on the upstream side of a step or shoulder 44a of an opening 44 in the slide plate 20. A replaceable filter element 24 can be positioned on or over the upstream side of each breaker plate 23. The molten polymer 36 can flow through the filter element 24 and the breaker plate 23 of the aligned filter assembly for filtration. The openings 44 and filter assemblies A and B, can be generally circular in shape. A hydraulic cylinder 22 or other suitable actuator can be mounted to a mounting plate or member 48, that in turn can be mounted to the spacer bars 17. The reciprocating rod of the cylinder 22 can be attached or coupled to an end of the slide plate 20 by a coupler or coupling member 21, for reciprocating the slide plate 20 along axis C, between filter assembly A and filter assembly B, in the direction of arrows 50. This can allow one filter assembly A or B, to be positioned across extrusion bore 12 for filtering molten polymer 36, while the other filter assembly is being replaced. Planar sealing surfaces 46a on the upstream and downstream faces 46 of the slide plate 20, surround the openings 44, and can provide or act as sealing surfaces for and around the filter assemblies A and B.

A sealing device or arrangement 56 can seal against the slide plate 20 and around a filter assembly A or B. The planar surfaces 46a of slide plate 20 can mate or engage with a downstream periphery seal 25 on the downstream face 46 of slide plate 20, and an upstream periphery seal 26 on the upstream face 46 of slide plate 20 to seal around a filter assembly A or B that is positioned across extrusion bore 12 within gap 38 on both upstream and downstream sides. The upstream 26 and downstream 25 seals can be generally circular or annular in shape for sealing around circular filter assemblies A and B, and can be seated within respective generally circular or annular periphery seal cavities or counterbores 28 and 27, in the upstream and downstream housing portions 15 and 16, which can circumferentially or concentrically surround the extrusion bore 12 and axis E. Molten polymer 36 can flow through a sealed extrusion bore 12 path along axis E, across the gap 38 between the upstream housing portion 15 and the downstream housing portion 16, and through a filter assembly A or B, due to the seated seals 26 and 25 engaging and sealing planar sealing surfaces 46a on the faces 46 of the slide plate 20, which prevent leakage of molten polymer 36 to the atmosphere.

The upstream seal 26 can have inner diameter periphery surfaces 26c, outer diameter periphery surfaces 26d, a circular or annular periphery thrust surface 26a at the upstream axial end of the seal 26, and a circular or annular periphery sealing surface 26b at the downstream or opposite axial end of the seal 26 for sealing against the upstream face 46 of slide plate 20. The thrust surface 26a can be annularly angled inwardly starting from the outer diameter surfaces 26d at the upstream axial end, and angling inwardly in the downstream direction to terminate at the inner diameter surfaces 26c, thereby forming an annular concave conical surface area. The inner diameter surfaces 26c can have an upstream portion with a constant diameter, and a downstream portion which angles or tapers slightly outwardly. A circular or annular periphery axial gap regulating ring or member 34, can be positioned within the upstream annular cavity or counterbore 28 and on the upstream side of the upstream seal 26, proximate to or against the thrust surface 26a.

A spring arrangement or device 52 can be positioned around the outer diameter periphery surfaces 26d of the upstream seal 26 for axially biasing the sealing surface 26b against the upstream face 46 of the slide plate 20, with a preload bias that has enough force $F_1$ to prevent low pressure molten polymer 36 within extrusion bore 12, such as during startup, from leaking to the atmosphere between slide plate 20 and seals 26 and 25. The preload bias is light enough to allow slide plate 20 to be easily translated along axis C without experiencing excessive or accelerated wear or damage to the slide plate 20 and/or seals 25 and 26, when shifting between filter assemblies A and B, which can be done when the pressure of the molten polymer 36 within extrusion bore 12 is low, or not present such as at rest. The spring device 52 can be generally circular or annular in shape, and can be circumferentially positioned concentrically around the outer diameter periphery surfaces 26d of the upstream seal 26 and around axis E, between the upstream housing portion 15 and an annular shoulder 30 of the seal 26, that can be near the sealing surface 26b at the downstream axial end. In some embodiments, the spring device 52 can be seated within an annular periphery spring device cavity or counterbore 32 in the upstream housing portion 15, which can circumferentially or concentrically surround counterbore 28 and axis E. The spring device 52 can include a flat circular or annular spacer, ring or washer cover member 29 positioned within counterbore 32 against shoulder 30, and at least one or more annular compression springs 31, such as wave springs or wave spring washers, positioned within counterbore 32 against the spacer 29, and between the spacer 29 and the upstream axial end wall or shoulder 32a of the counterbore 32. The spacer 29 can extend in or across the annular gap between the shoulder 30 of the outer diameter wall surface 32b of counterbore 32, and can prevent or limit contaminants from the atmosphere side of the extrusion bore 12 from entering or collecting on or around the one or more compression springs 31. The one or more compression springs 31 can be in axial compression against the upstream housing portion 15 within counterbore 32 for generating the axial force against shoulder 30 for axially biasing the upstream seal 26 in the downstream axial direction against the slide plate 20. By being arranged concentrically around the outer diameter periphery surfaces 26d of the seal 26, the annular spring device 52 and the one or more annular springs 31, can provide the annular sealing surface 26b with a substantially constant, uniform or even biasing force $F_1$, in the downstream axial direction at all circumferential locations of the sealing surface 26b, to provide uniform preload sealing against the slide plate 20. The size, type and number of springs 31 can be varied to obtain the desired amount of biasing force $F_1$. In some embodiments, the counterbore 32 and/or the spacer 29 can be omitted.

The outer diameter surfaces 26d of upstream seal 26 can have a close fit with the outer diameter wall surfaces 28b of counterbore 28 to provide or form mating sealing surfaces for preventing or limiting leakage of molten polymer 36 from the extrusion bore 12 therethrough. To provide further sealing, an annular periphery or circumferential seal 33 such as an "O" ring, can be positioned or seated within an annular periphery cavity or groove 35, which can be formed on or in the outer diameter surfaces 26d of seal 26. The annular seal 33 can be positioned between the outer diameter surfaces 26d of the seal 26 and the mating sealing surfaces of the outer diameter wall surfaces 28b of counterbore 28, or against surfaces 28b, upstream of the spring device 52 to provide further sealing, which can also prevent or limit molten polymer 36 from the extrusion bore 12 from reaching, entering or collecting around the spring device 52. In some embodiments, the annular seal 33 can be positioned within a groove formed in the outer diameter wall surfaces 28b of counterbore 28 and can be positioned against surfaces 26d of seal 26. The annular seal 33 can be any suitable circumferential, periphery or annular seal, and can also be a piston seal. The outer diameter surfaces 26d of the seal 26 can mate with most of the axial length of the outer diameter wall surfaces 28b, and extend close to the upstream annular axial end wall or shoulder 28a of the counterbore 28. This can provide a long axial mating length that can provide sealing and can limit the formation of cavity spaces in the counterbore 28 that can trap and heat degrade the molten polymer 36.

The circular or annular periphery axial gap regulating ring or member 34 can have a tapered angled surface 34a on the downstream axial end, that can angle inwardly in the downstream direction from the outer diameter periphery surfaces 34d to the inner diameter periphery surfaces 34c. The angled surface 34a can form a complimentary angled annular convex conical surface that mates with the angled annular concave surface 26a of the seal 26. The upstream axial end of the member 34 can have a flat upstream annular periphery end face or surface 34b. The inner diameter periphery surfaces 34c can smoothly join with or transition to the inner diameter periphery surfaces 26c of the upstream seal 26 so that the molten polymer 36, can flow in a smooth manner through extrusion bore 12. The inner 34c and outer 34d diameter periphery surfaces of the axial gap regulating member 34 can be solid or smooth for preventing unnecessary trapping of molten polymer 36. The axial length of the axial gap regulating member 34 is sized in the direction of axis E so that there can be a circular or annular periphery polymer pressure gap 54 between the upstream annular periphery end, face or surface 34b, and the upstream annular axial end surface 28a of counterbore 28. The surfaces 28a and 34b can be smooth, flat and parallel to each other, and can be at a right angle to axis E. The gap 54 can be sized to provide a thin or narrow annular periphery polymer pressure clearance gap 54 that is of sufficient height or size, for example about 0.005 to about 0.045 inches high, and often about 0.025 inches, for permitting entry of a thin circular or annular periphery film of molten polymer 36 which as pressure increases, can exert an axial circular or annular periphery force $F_2$ on the upstream surface 34b of the axial gap regulating member 34, thereby also exerting an axial circular or annular periphery force $F_2$ against the thrust surface 26a of the seal 26, by axially forcing the member 34 against the thrust surface 26a. Viscous drag of the molten polymer 36 flowing through extrusion bore 12 can initially move the member 34 axially downstream against the seal 26. The annular polymer pressure gap 54 allows the thin annular film of molten polymer 36 to provide a uniform or even axial annular force $F_2$ on the annular upstream surface 34b, so that increasing pressure of molten polymer 36 on the extrusion bore 12 can uniformly bias the sealing surface 26b of the seal 26 against the slide plate 20 with proportional increasing force. On the other hand, the small size and smooth surfaces of the gap 54 also limits the amount or quantity of molten polymer 36 that can be trapped therein and heat or thermally degraded.

In order to further limit the amount of molten polymer 36 that can be trapped and heat degraded, the axial gap regulating member 34 can be formed of a material such as a metal having a higher coefficient of thermal expansion than other adjacent or nearby components of the screen changer 10, such as the housing portions 15 and 16, seals 25 and 26 and slide plate 20. In some embodiments, the member 34 can be formed of bronze, with a solid construction, and smooth inner 34c and outer 34d diameter surfaces. The housing portions 15 and 16, seals 25 and 26 and slide plate 20, can be formed of steel. Consequently, as the heat of the steel components of the screen changer 10 increases during extrusion, such as from cartridge heaters 70, the size of the annular polymer pressure gap 54 would normally tend to become larger and trap more molten polymer 36, but for the axial gap regulating member 34. By forming the axial gap regulating member 34 from a metallic material such as bronze, having a higher coefficient of thermal expansion than the steel components, the axial gap regulating member 34 can expand and move in the axial direction relative to axis E, thereby preventing or limiting the annular polymer pressure gap 54 from enlarging in size in the axial direction along axis E, consequently minimizing its size. In some cases the size of the gap 54 can become smaller or reduced in size as temperature increases. This further limits the amount of molten polymer 36 from entering gap 54, such that only a minimal amount of molten polymer 36 gets heat or thermally degraded, and such contaminants are kept to a minimum. The metallic or bronze member 34 can also withstand the high temperature that can occur during extrusion, and does not become mishapen. The outer diameter periphery surfaces 34d of the axial gap regulating member 34 can have a slightly smaller diameter than the outer diameter periphery surfaces 26d of the seal 26 and the counterbore 28, to allow space or room for radial outward expansion of the member 34, so as not to expand and lock against the wall surfaces 28b of the counterbore 28. The taper of angled surface 34a allows radial expansion of member 34 to expand the angled surface 34a radially outward, which in conjunction with the mating angled thrust surface 26a, can expand or move the upstream surface 34b closer to the surface 28a in the axial direction to reduce or minimize gap 54. The inner diameter surfaces 34c can have a relatively large axial length due to the tapered design, to provide sufficient material to also promote axial expansion of member 34.

Consequently, during use, before molten polymer 36 flows through the extrusion bore 12, the upstream seal 26 is biased against the upstream sealing surfaces 46a of the slide plate 20 with a light preload bias force $F_1$ by the spring device 52. The light preload bias allows the slide plate 20 to be translated along axis C in the direction of arrows 50, to position one filter assembly A or B across the extrusion bore 12, and to position the other filter assembly offline to change the filter element 24, without causing excessive wear or damage to the slide plate 20, and seals 25 and 26. When low pressure molten polymer 36 starts to flow through extrusion bore 12, the light preload bias force $F_1$ provided by the spring device 52 is sufficient to prevent or limit leakage of low pressure molten polymer 36 between the slide plate 20 and seals 25 and 26 to the atmosphere. As the pressure of the molten polymer 36 within extrusion bore 12 increases until reaching extrusion operating pressure, the molten polymer 36 moves radially outwardly and enters the annular periphery polymer pressure gap 54, which peripherally, circumferentially or concentrically surrounds the extrusion bore 12. The increasing or increased pressure of the molten polymer 36 within the gap 54 exerts an increasing or increased annular periphery axial force $F_2$ against the surface 34b of the axial gap regulating member 34, and the thrust surface 26a of the upstream seal 26, for axially forcing the seal 26 against the slide plate 20 with an increasing or increased bias that is proportional to the pressure of the molten polymer 36, so that the leakage of the higher pressure molten polymer 36 is prevented or limited. The axial gap regulating member 34 can expand and move axially to limit the size of the annular polymer pressure gap 54. The small or minimized size of the gap 54, and the smooth continuous exposed and mating surfaces of components such as member 34, seal 26 and counterbore 28, can limit the amount of molten polymer 36 that is trapped and heat degraded.

Figure 4:
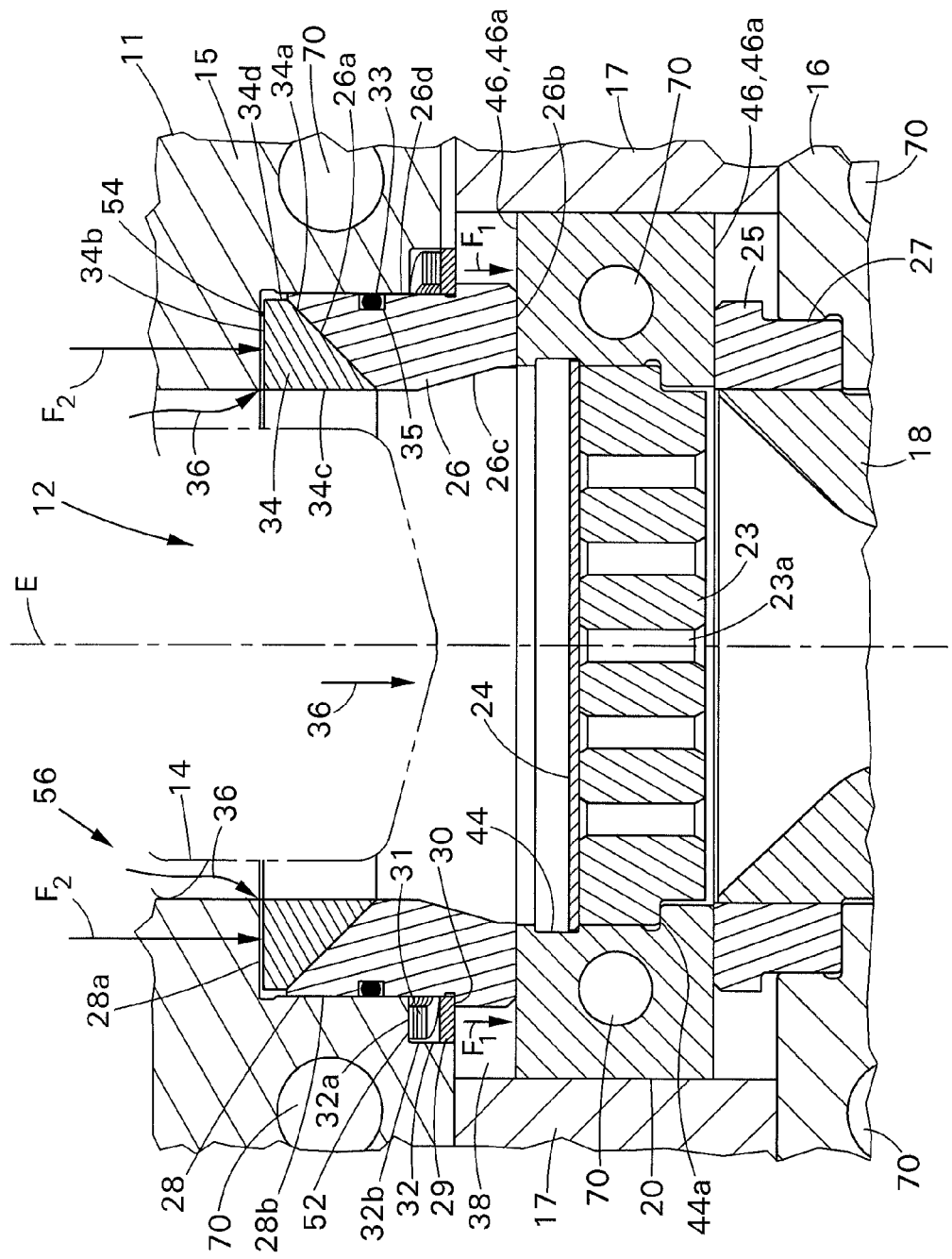
FIGS. 4 and 5 are enlarged views of FIG. 3, showing possible alternative positions of an axial gap regulating member.
Figure 5:
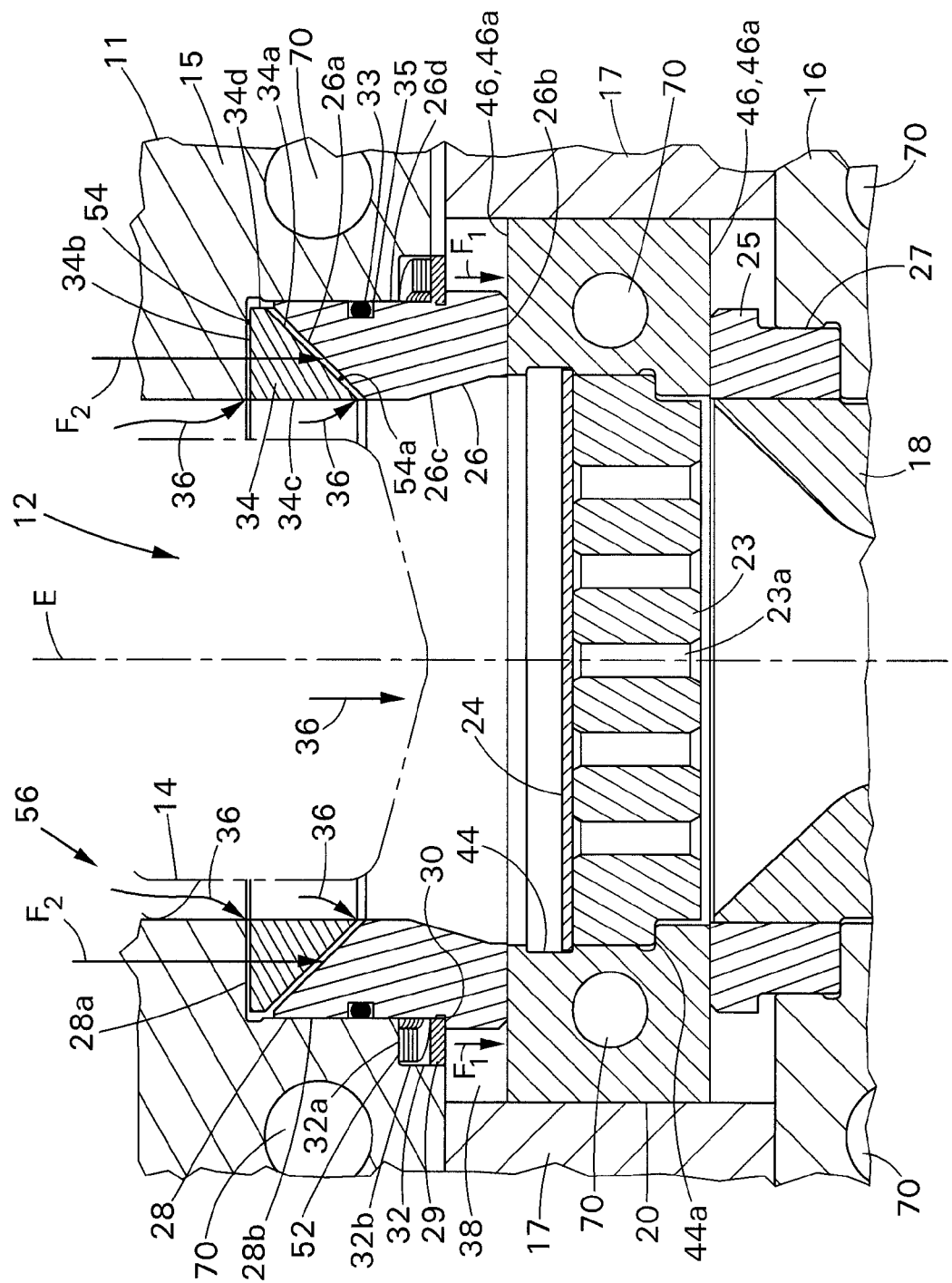

Referring to FIG. 5, in some cases, as the pressure of the molten polymer 36 increases up to operating pressure, the axial gap regulating member 34 can be surrounded by molten polymer 36 and suspended or floated within the counterbore 28 to be separated from the upstream seal 26 by an inwardly angled annular periphery polymer pressure clearance gap 54a that extends between surfaces 34a and 26a. The molten polymer 36 can enter the annular polymer pressure gap 54a and form a thin inwardly angled annular periphery film of molten polymer 36 which can provide a uniform or even axial annular periphery force $F_2$ on the angled annular periphery thrust surface 26a of the seal 26, for uniformly biasing the sealing surface 26b of the seal 26 against the slide plate 20, with proportional increasing or increased force. In some cases, there can additionally be an annular periphery polymer pressure gap 54 between surfaces 34b and 28a, but does not typically add or contribute to the force $F_2$ caused by the molten polymer 36 in the polymer pressure gap 54a. Consequently, as seen in FIGS. 4 and 5, the pressure of molten polymer 36 can act on the thrust surface 26a of the seal 26 in two ways, directly on thrust surface 26a as seen in FIG. 5, or via the axial gap regulating member 34 which transfers the force onto the thrust surface 26a, as seen in FIG. 4. In either situation, the higher coefficient of expansion of the axial gap regulating member 34, and its smooth surfaces 34a, 34b, 34c and 34d, limits the formation of polymer trapping recesses or cavities, limits the size of gaps 54 and/or 54a, and the amount of molten polymer 36 that can be trapped and heat degraded. In addition, the smooth continuous inner 34c and outer 34d diameter surfaces of the member 34 can help prevent or limit leakage of molten polymer 36 past seal 26.

In one embodiment, for example, the counterbore 28 can have a diameter that is 4.875 to 4.877 inches, and the outer diameter surfaces 26d of the upstream seal 26 that fit into the counterbore 28 can have a diameter of 4.872 to 4.874 inches, so that there can be about a 0.005 inch clearance therebetween (0.0025 inches per side). The thrust surface 26a of seal 26 and the tapered angled surface 34a of member 34 can be angled inwardly at about 45°, relative to axis E. The combined axial length of the upstream seal 26 and the axial gap regulating member 34 can be about 1.795 inches, and the axial height of gap 54 and/or gap 54a (alone or combined) can be about 0.005 to about 0.045 inches, and often about 0.025 inches. The axial height of member 34 alone can be about ¾ inches (such as 0.795 inches), and the inner diameter surfaces 34c can have a diameter of 3.555 to 3.560 inches. A counterbore 28 with a diameter of 4.875 to 4.877 inches, and an axial gap regulating member 34 having an inner diameter of 3.555 to 3.560 inches, can form a polymer pressure gap 54 with an outer diameter OD of about 4.8 inches, an inner diameter ID of about 3.5 inches, and an OD/ID ratio of about 1.37. For such OD and ID dimensions, if a polymer pressure gap 54 and/or 54a has an axial height of about 0.025 inches, the volume of the gap 54 and/or 54a and the molten polymer 36 trapped therein can be only about 0.22 in$^3$. It is understood that these dimensions and materials can vary depending on the situation at hand depending upon the size, model and purpose of the extruder 13 and downstream equipment.

Figure 3:
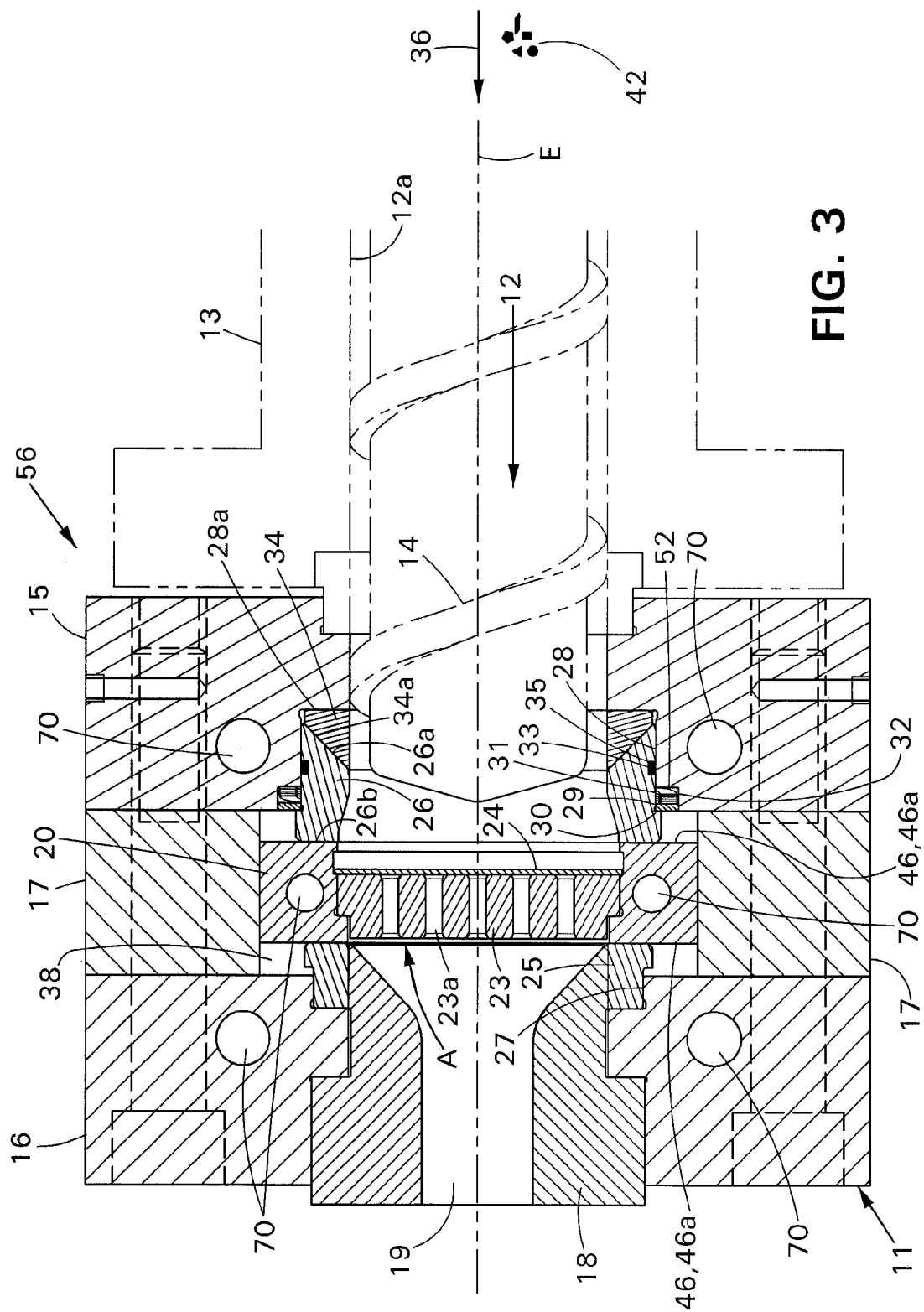
FIG. 3 is an enlarged sectional view of the extrusion bore region.

Referring to FIGS. 6 and 7, in another embodiment, the upstream seal 26 and member 34 of FIG. 3 can be replaced with upstream seal 126 and axial gap regulating member 134. Upstream seal 126 differs from seal 26 in that the inner diameter periphery surfaces 26c can have a constant diameter, and the thrust surface 26a can be angled inwardly at a shallower angle relative to axis E, such as about 30°, for smooth flow. The upstream annular end wall 28a of annular cavity 28 can be outwardly tapered or angled moving in the downstream direction, for example about 30° relative to axis E. The axial gap regulating member 134 can have two annular angled or tapered surfaces 34a and 34b which are joined together at the outer diameter surface 34d. The surfaces 34a and 34b can be angled or tapered at the same angle as corresponding surfaces 26a and 28a, and can form an annular periphery polymer pressure clearance gap 54a and/or annular periphery polymer pressure clearance gap 54 therebetween. Molten polymer 36 can flow radially outwardly into gap 54a and/or 54 to press against or engage the thrust surface 26a or surface 34b, for exerting an annular periphery axial force $F_2$ on the annular periphery thrust surface 26a for axially biasing the sealing surface 26b against the slide plate 20 with a force proportional to the pressure of the molten polymer 36. By having two tapered surfaces 34a and 34b, the axial gap regulating member 134 can thermally expand and utilize the axial movement properties of the two tapered surfaces 34a and 34b to minimize or reduce the size of gap 54a and/or 54 as heat increases.

While this invention has been particularly shown and described with references to example embodiments thereof, it will be understood by those skilled in the art that various changes in form and details may be made therein without departing from the scope of the invention encompassed by the appended claims.

For example, in some embodiments, the axial gap regulating member 34 and the seal 26 do not have to have tapered surfaces. The axial gap regulating member 34 can be a flat annular ring. Although the axial gap regulating member 34 is typically formed of bronze, other suitable methods with high coefficients of expansion can be used, for example brass, or aluminum, which can be coated with nickel, chrome or Teflon™. In addition, materials that are not metallic, but have higher coefficients of expansion than steel can be used, such as some thermoset plastics or polymers, or composites, such as polyimide, or Teflon™ filled with bronze powder or glass fibers. The seals 25 and 26 do not have to be generally circular, and can have other suitable shapes, as can the polymer pressure gap 54 or 54a. The springs device 52 can include other suitable types of springs, such as Belleville springs, or a series of coil or leaf springs positioned at selected positions around the seal 26.

What is claimed is:

1. A sealing device for sealing a slide plate in a polymer filtration apparatus where the slide plate is translatable across an extrusion bore extending through a housing of the polymer filtration apparatus, the extrusion bore extending along an axial direction, the sealing device comprising:
 a periphery seal having inner periphery surfaces, outer periphery surfaces, an axial periphery sealing surface at a downstream axial end for contacting and sealing against the slide plate, and a periphery thrust surface located at an upstream axial end of the seal, the seal being seated in a seal cavity surrounding the extrusion bore;
 a spring device positioned around the outer periphery surfaces of the seal for axially biasing the sealing surface of the seal against the slide plate with a preload bias; and
 a periphery axial gap regulating member having upstream and downstream axial end surfaces positioned within the seal cavity between the thrust surface at the upstream axial end of the seal and an upstream axial end surface of the seal cavity, the axial gap regulating member being sized to provide a generally annular periphery polymer pressure gap between the upstream axial end surface of the seal cavity and the upstream axial end surface of the axial gap regulating member, that is sized for permitting entry into said gap of a generally annular thin periphery film of polymer extending circumferentially from the extrusion bore for exerting a generally annular periphery polymer pressure force in the axial direction against the upstream axial end surface of the axial gap regulating member that is transmitted by the axial gap regulating member axially against the thrust surface of the seal, increasing pressure of polymer in the extrusion bore causing the sealing surface to be further biased against the slide plate, while at the same time minimizing an amount of polymer trapped and heat degraded in the polymer pressure gap, the axial gap regulating member being formed of a material having a higher coefficient of expansion than the seal and the housing, for expanding and minimizing the size of the polymer pressure gap as heat increases.

2. The sealing device of claim 1 in which the periphery seal is an annular seal having inner diameter surfaces and outer diameter surfaces, an annular sealing surface and an annular thrust surface, the seal being seated in an annular seal cavity surrounding the extrusion bore, and the spring device being positioned circumferentially around the outer diameter surfaces of the seal.

3. The sealing device of claim 2 in which the spring device comprises at least one wave spring mounted concentrically around the seal and between the housing and a shoulder of the seal.

4. The sealing device of claim 3 in which the spring device is positioned within an annular spring device cavity in the housing surrounding the seal, the spring device further comprising an annular cover member positioned in the annular spring device cavity and covering the at least one wave spring for preventing entry of contaminants from the atmosphere into the annular spring device cavity.

5. The sealing device of claim 3 further comprising a circumferential seal positioned within the annular seal cavity between the outer diameter surfaces of the seal and mating sealing surfaces of the annular seal cavity upstream of the spring device.

6. The sealing device of claim 2 in which the axial gap regulating member is formed of metal and annular in shape, the axial gap regulating member being positioned within the annular seal cavity between the thrust surface at the upstream axial end of the seal and an upstream axial end surface of the annular seal cavity, the axial gap regulating member being sized to provide an annular polymer pressure gap that is sized for permitting entry of a thin annular film of polymer for exerting an axial annular force against the thrust surface of the seal.

7. The sealing device of claim 6 in which the thrust surface of the seal is angled inwardly starting from the outer diameter surfaces at the upstream axial end.

8. The sealing device of claim 7 in which the axial gap regulating member has at least one tapered surface, that engages the thrust surface of the seal.

9. The sealing device of claim 8 in which the seal and housing are formed of steel and the axial gap regulating member is formed of bronze.

10. The sealing device of claim 9 in which the axial gap regulating member is solid with smooth inner and outer diameter surfaces.

11. The sealing device of claim 10 in which the polymer pressure gap is about 0.005 to about 0.045 inches.

12. A polymer filtration apparatus comprising:
 a housing having an extrusion bore extending therethrough, the extrusion bore extending along an axial direction;
 a slide plate having at least one filter translatable across the extrusion bore; and
 a sealing device comprising
  an annular seal having inner diameter surfaces, outer diameter surfaces, an axial annular sealing surface at a downstream axial end for contacting and sealing against the slide plate, and an annular thrust surface located at an upstream axial end of the seal, the seal being seated in an annular seal cavity in the housing surrounding the extrusion bore;
  at least one wave spring mounted concentrically around the seal and between the housing and a shoulder of the seal for axially biasing the sealing surface of the seal against the slide plate with a preload bias; and
  an annular metallic axial gap regulating member having upstream and downstream axial end surfaces positioned within the annular seal cavity between the thrust surface at the upstream axial end of the seal and an upstream axial end surface of the annular seal cavity, the annular metallic axial gap regulating member being sized to provide an annular polymer pressure gap between the upstream axial end surface of the seal cavity and the upstream axial end surface of the axial gap regulating member, that is sized for permitting entry into said gap of a thin annular film of polymer extending circumferentially from the extrusion bore for exerting an axial annular polymer pressure force in the axial direction against the upstream axial end surface of the axial gap regulating member that is transmitted by the axial gap regulating member axially against the thrust surface of the seal, increasing pressure of polymer in the extrusion bore causing the sealing surface to be further biased against the slide plate, while at the same time minimizing an amount of polymer trapped and heat degraded in the annular polymer pressure gap, the annular metallic axial gap regulating member being formed of a metal having a higher coefficient of expansion than the seal and the housing, for expanding and minimizing the size of the annular polymer pressure gap as heat increases.

\* \* \* \* \*